March 11, 1947.  A. R. VISITACION  2,417,223
ELECTRIC STOVE CONTROL
Filed Aug. 3, 1946
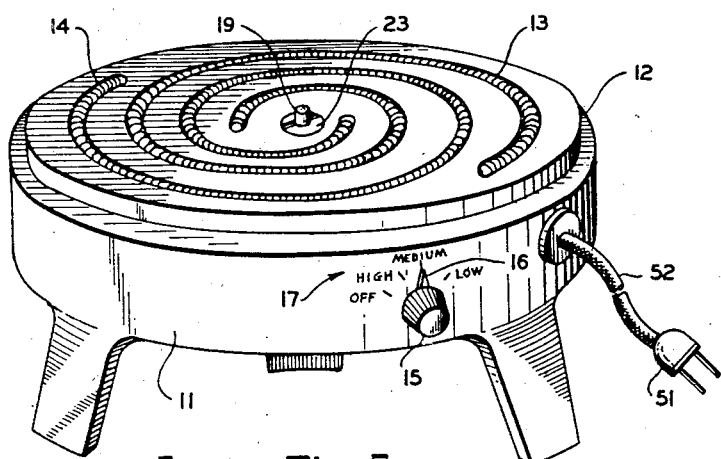
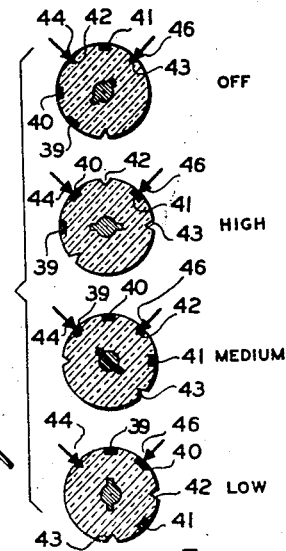
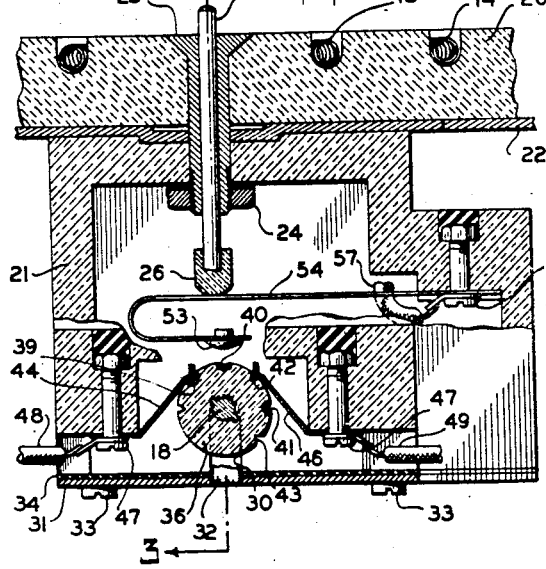
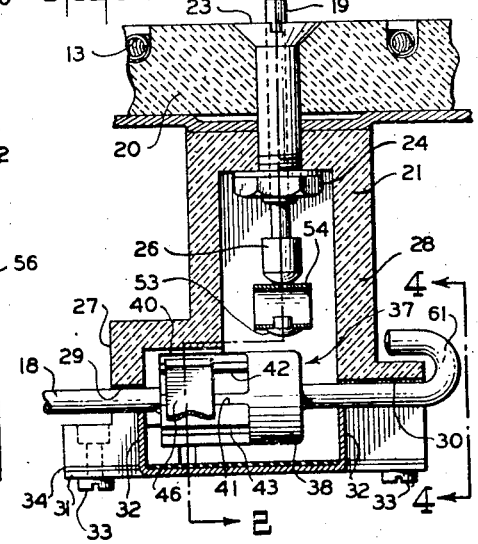
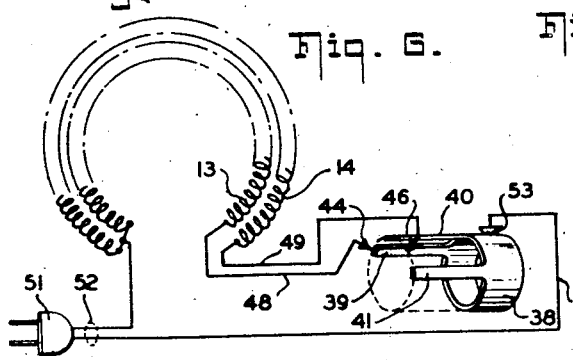
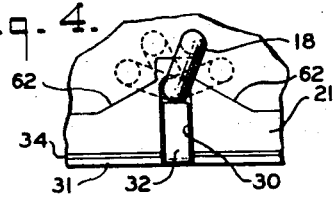
INVENTOR
ANICETO R. VISITACION
BY Morris Relson
ATTORNEY Patented Mar. 11, 1947

2,417,223

UNITED STATES PATENT OFFICE 2,417,223

ELECTRIC STOVE CONTROL

Aniceto R. Visitacion, New York, N. Y.

Application August 3, 1946, Serial No. 688,327

3 Claims. (Cl. 219—37)

The present invention pertains to the art including electric stoves, such as electric "hot plates," electric ranges, or the like, and is more particularly directed toward improvements in control devices for such apparatus.

According to the present invention, an electric stove or like device is provided with an improved and novel control means which is simple, inexpensive to fabricate and easy to assemble, and which permits adjustment of the heat level provided, while simultaneously placing the entire device under the control of the utensil supported on the heating unit, so that no current is permitted to flow to produce heat unless the utensil is placed on the device.

Other objects and advantages of the present invention will become apparent from the following specification and drawings showing a preferred embodiment of the invention, wherein Figure 1 is a perspective elevation view of a single unit stove incorporating the present invention;

Figure 2 is an elevational cross-sectional view of the control switch unit of the present invention, viewed on line 2—2 of Figure 3;

Figure 3 is a similar elevational cross-sectional view of the device of Figure 2, viewed along line 3—3 thereof;

Figure 4 is a fragmentary elevational view of a portion of Figure 3, viewed along line 4—4 thereof and showing the stop arrangement for the switch;

Figure 5 is a diagrammatic representation of the switch drum and contacts, showing their relationship for the different switch positions;

Figure 6 is a schematic wiring diagram of the electrical circuit of the invention.

Referring to the drawings, the invention is illustrated as applied to a single-heater electric "hot plate," although it will be understood that it is equally applicable to any number of units, as in a multi-unit electric range, each unit being provided with one of the control switch devices described hereinbelow.

Figure 1 shows a conventional one-unit electric "hot-plate" provided with the control switch device of the present invention. The "hot plate" includes a stand 11 carrying a two-filament heater 12 having a low resistance (high heat) filament 13 and a high resistance (low heat) filament 14 supported in grooves in a refractory disc 20.

In use, a low level of heat is produced by energizing filament 14 alone, a medium level by energizing filament 13 alone, and a high heat level is produced by energizing both filaments 13 and 14 simultaneously. The heat level (or off condition) is selected by a selector knob 15 having a pointer 16 cooperating with indicia 17 supported on the stand 11. Knob 15 is coupled by a shaft 18 to the control switch unit shown in more detail in Figures 2 to 4.

Projecting up through the center of the heater 12 for a short distance ($\frac{3}{16}$ to $\frac{5}{16}$ inch) is the tip of a plunger 19 which normally maintains both filaments 13 and 14 de-energized until pressed downward by the weight of a utensil placed on the stove to be heated thereby. When depressed, plunger 19 permits the heater 12 to be energized to the level set by selector knob 15. In this way considerable electrical energy can be saved (since current flows only when heat is desired) and the inconvenience of using a separate switch for turning current on and off is avoided. Also, as will be seen, the level of heat desired can be set by knob 15 and left adjusted, with no current flow until plunger 19 is depressed.

The details of the switch control unit permitting the above-described operation are shown in Figures 2 through 6. The switch unit comprises an insulating housing 21 preferably integrally molded, as of porcelain, which encases and supports the switch elements. Housing 21 is hung from stand 11 by a flat-top bolt 23 which passes through aligned central openings in heater 12, the top surface 22 of stand 11, and the top of housing 21, and is held by a cooperating nut 24. Bolt 23 is centrally bored to slidably receive plunger 19, which is terminated in an insulating tip 26, formed, for example, of molded porcelain.

A pair of opposed side walls 27, 28 of housing 21 are formed with aligned slots 29, 30 extending equal distances up from their bottom edges and adapted to receive switch shaft 18. Shaft 18 is retained in position substantially at the top of slots 29, 30 by a base plate 31 having a pair of upwardly extending lugs 32 fitting into slots 29, 30 with flat upper edges bearing against and supporting shaft 18. Plate 31 is removably fastened to housing 21 in any convenient fashion, as by screws 32. If plate 31 is metallic, an insulator plate 34 may be interposed between it and housing 21 to prevent accidental short circuit.

Rigidly fixed to shaft 18 is a switch drum having a substantially cylindrical insulating portion 36 fixed to shaft 18 in any suitable manner and a sheet-metal conductor portion 37 supported on and overlying part of the drum insulator 36. Drum conductor 37 has a cylindrical portion 38 at one end to which are integrally connected three axially extending conductor strips 39, 40, 41 preferably supported within corresponding grooves in drum insulator 36. As shown in Figures 2 and 5, strip 40 is spaced 45 degrees from strip 39, and strip 41 is spaced 90 degrees from strip 40. Also, halfway between strips 40 and 41 a detent groove 42 is formed in drum insulator 36, extending parallel to the drum conductor strips 39, 40, 41. A similar detent groove 43 is formed on drum insulator 36 spaced 45 degrees from conductor strip 41.

Cooperating with drum conductor strips 39, 40, 41 are a pair of spring brushes 44, 46 supported from housing 21 by screws 47 and having crimped ends forming V contacts cooperating with the drum conductor strips 39, 40, 41, which are preferably formed with external grooves serving as detents for brushes 44, 46, as seen in Figure 2.

Aligned above the drum conductor cylinder 38 and normally spaced therefrom is a contactor 53 carried by a cantilever leaf spring 54 having one end fixed to housing 21 by a screw 56. Spring 54 is also aligned with tip 26 of plunger 19, and normally keeps plunger 19 extending above the top surface of heater 12, while maintaining contactor 53 away from drum conductor cylinder 38. Contactor 53 is connected by spring 54 and a wire 57 to one conductor of a cable 52 and thence to one terminal of a conventional two-prong plug 51. When plunger 19 is depressed by the weight of a utensil placed upon heater 12, spring 54 is bent downward by plunger tip 19 and contactor 53 touches drum conductor cylinder 38 to complete the circuit from plug 51 to drum conductor 37. Of course, as soon as the utensil is removed, spring 54 at once elevates plunger 19 to its former position and breaks contact between drum cylinder 38 and contactor 53. Since contactor 53 is in the main supply circuit for the entire device, it maintains the heater inoperative, no matter what the setting of knob 15 may be, so long as plunger 19 is not depressed.

As shown in Figure 6, brush 44 is connected by a wire 48 to one end of low-resistance heater filament 13. Similarly, brush 46 is connected by a wire 49 to one end of high-resistance heater filament 14. The other ends of filaments 13 and 14 are connected together to the other conductor cable 52 and thence to the other terminal of plug 51.

Figure 5 shows most clearly how brushes 44, 46 and drum conductor strips 39, 40, 41 cooperate to provide a four-position control ("low," "medium," "high," and "off") for the electric stove. In this figure, brushes 44 and 46 are shown schematically, while the drum contactor strips 39, 40, 41 are shown in cross-section, viewed similarly to Figure 2. Detent grooves 42 and 43 are also shown.

In the upper view of Figure 5, knob 15 is turned to the leftmost position, where brushes 44 and 46 contact only detent grooves 42 and 43 of drum insulator 36, so that no circuit is closed to either filament 13 or 14, and the apparatus remains unenergized even when plunger 19 is depressed. This is the "off" position.

In the next view shown in Figure 5, knob 15 has been turned 45 degrees clockwise, thereby rotating drum conductor 37 through the same angle. Now brush 44 contacts strip 40, while brush 46 contacts strip 41. Thus both heater filaments 13 and 14 are connected to drum conductor 37, and both are energized when plunger 19 is depressed. This is the "high" position.

In the third view shown in Figure 5, knob 15 has been turned 45 degrees more, to the "medium" setting. Now brush 44 contacts strip 39 while brush 46 lies in detent groove 42 and is thus open-circuited. Hence only low-resistance filament 13 is in the circuit, corresponding to "medium" heat. This is the position shown in Figures 2 and 3.

Similarly, in the lowest view of Figure 5, knob 45 has been turned 45 degrees more to the "low" position, and brush 44 is open-circuited, while brush 46 is connected to strip 40, thereby connecting high-resistance filament 14 in the circuit to provide low heat. Thus the four positions of knob 15 and drum 37 provide "off," "high," "medium" and "low" control.

To provide an end-wise stop to keep drum 37 in proper axial position relative to brushes 44, 46 and contactor 53, and simultaneously to provide a rotary stop, the free end of shaft 18 is bent around as shown at 61 in Figure 4. This bent end 61 cooperates with slanted surfaces 62 formed on housing 21 to permit only approximately 180 degrees of rotation of shaft 18. Since the four positions of drum 37 require only 135 degrees of angle, this rotary stop arrangement permits full use of the device, while preventing undesired connections which might be produced by further rotation of drum 37. The three additional positions of shaft 18 are shown in dotted lines in Figure 4, to indicate their relation to stop surfaces 62.

Accordingly, as described above, the present invention provides an extremely simple combined utensil-actuated and multiple-position manually actuated switch for electric "hot plates" or the like. However, the scope of the invention is indicated only by the appended claims and is not to be limited by the purely illustrative embodiment described in detail above.

I claim:

1. An electric stove apparatus comprising a heater element having a pair of independent heater filaments mounted on a refractory plate having a central aperture, a rotatable conductor drum having a completely cylindrical portion at one end thereof and three conductor strips axially extending therefrom toward the other end, a spring, a contactor supported on said spring opposite said cylindrical portion and adapted to close contact with said cylindrical portion upon flexure of said spring, a plunger extending through said plate aperture to slightly above said plate and operatively positioned relative to said spring to flex said spring to make contact between said drum cylindrical portion and said contactor upon depression of said plunger, as by a utensil placed upon said plate, a pair of brushes disposed opposite said drum conductor strips and adapted to contact one or both of said strips upon proper orientation of said drum, said brushes being connected respectively to one end of each of said filaments, the other ends of said filaments being connected together and to an input terminal and a second input terminal being connected to said spring, whereby said contactor and cylindrical portion serve as a cut-off switch for said filaments, and said brushes and conductor strips serve as a selector switch for connecting one or the other or both said filaments to said input terminals.

2. An electric stove apparatus as in claim 1 wherein said brushes are spaced 90 degrees apart around said drum and wherein one of said strips is spaced 45 degrees from a second strip on one side of said one strip and 90 degrees from the third strip on the other side of said one strip, whereby, upon successive rotations of said drum through 45° angles, one filament, the other filament, both filaments, and neither filament, are successively connected to said input terminals.

3. An electric stove apparatus as in claim 1 further including an insulating housing surrounding said spring, contactor, drum, and brushes, and having an upper aperture aligned with said plate aperture and through which said plunger extends, and fastening means passing through said plate and housing apertures for joining the same, said last means being centrally bored to receive said plunger.

ANICETO R. VISITACION.